United States Patent [19]

Kurosawa et al.

[11] Patent Number: 4,992,319

[45] Date of Patent: Feb. 12, 1991

[54] ACTIVATED CARBON SUPPORTING HONEYCOMB STRUCTURE AND PROCESS FOR FABRICATING THE SAME

[75] Inventors: Masaji Kurosawa, Chiba; Isao Terada; Hideto Nakada, both of Kanagawa, all of Japan

[73] Assignee: Nichias Corporation, Tokyo, Japan

[21] Appl. No.: 352,200

[22] Filed: May 16, 1989

[30] Foreign Application Priority Data

May 18, 1988 [JP] Japan ................. 63-119173

[51] Int. Cl.$^5$ .............................................. B32B 3/12
[52] U.S. Cl. ............................. 428/116; 55/524; 156/292; 428/184
[58] Field of Search ............... 428/116, 184; 156/292; 55/524, 388

[56] References Cited

U.S. PATENT DOCUMENTS

| | | | |
|---|---|---|---|
| 3,019,127 | 1/1962 | Czerwonka et al. | 428/338 |
| 3,261,473 | 7/1966 | Riede | 55/486 X |
| 3,782,081 | 1/1974 | Munters | 55/524 X |
| 3,922,412 | 11/1975 | Yoshikawa et al. | 428/116 X |
| 4,012,206 | 3/1977 | Marcriss et al. | 55/390 X |
| 4,162,934 | 7/1979 | Norback | 162/155 |
| 4,223,458 | 9/1980 | Kihara | 428/242 X |
| 4,399,052 | 8/1983 | Sugino | 428/116 X |
| 4,402,717 | 9/1983 | Izumo et al. | 55/388 |
| 4,510,216 | 4/1985 | Nogami et al. | 429/199 X |
| 4,518,704 | 5/1985 | Okabayashi et al. | 428/116 X |
| 4,699,681 | 10/1987 | Kasmark, Jr. et al. | 428/408 X |
| 4,871,607 | 10/1989 | Kuma et al. | 428/184 X |
| 4,886,769 | 12/1989 | Kuma et al. | 428/116 X |

FOREIGN PATENT DOCUMENTS

| | | |
|---|---|---|
| 896345 | 5/1962 | Fed. Rep. of Germany . |
| 60-90808 | 5/1985 | Japan ................. 428/116 |

OTHER PUBLICATIONS

Chemical Abstracts, vol. 95, No. 26, p. 132, Dec. 1981, Abstract 222147d, (Toyobo Co. JA81-129 038 Abstract).

Primary Examiner—Henry F. Epstein
Attorney, Agent, or Firm—Cushman, Darby & Cushman

[57] ABSTRACT

A process for fabricating an activated carbon supporting honeycomb structure is disclosed which comprises the following steps: dipping an inorganic fiber made paper in a suspension of fine particulate activated carbon and a binder or coating the suspension over the inorganic fiber made paper; drying the paper so that the activated carbon will fill the voids between the fibers in the paper; superposing sheets of the activated carbon filled paper alternately with corrugated sheets of the same paper; and bonding the individual sheets together with an adhesive to form a honeycomb structure.

11 Claims, 1 Drawing Sheet

ACTIVATED CARBON SUPPORTING HONEYCOMB STRUCTURE AND PROCESS FOR FABRICATING THE SAME

BACKGROUND OF THE INVENTION

The present invention relates to a honeycomb structure that supports activated carbon and which has the ability to adsorb or decompose gases. The present invention also relates to a process for fabricating such a honeycomb structure.

When large volumes of gas are to be treated with activated carbon in an attempt at adsorbing or decomposing a certain component of the gas, it is desirable that the activated carbon used as the treatment medium should experience the lowest possible pressure loss. To satisfy this need, JP-A-60-90808 (the term "JP-A" as used herein means an "unexamined published Japanese patent application") has proposed that a material for activated carbon be extruded in a honeycomb shape, carbonized and further activated for use as activated carbon in decomposing the ozone in an ozone-containing gas. This honeycomb structure has an activated carbon loading of 300 g per liter of unit volume and assures high performance as evidenced by a benzene or methanol adsorption of 50 mg/L and an ozone decomposition efficiency of 85% after the passage of 80 h. However, it is difficult to fabricate large and robust honeycomb structures by extrusion molding and the applicable structure that is proposed in JP-A-60-90808 has been limited to small sizes. In addition, this practically all carbon honeycomb structure has had the following disadvantages in spite of large adsorption capacity per unit weight; because of the tendency of activated carbon to consolidate, not all of the activated carbon provides an effective surface for adsorption; a cumbersome treatment is necessary such as activation that follows shaping; the honeycomb structure is prone to cracking and requires very careful handling; the structure is too expensive to be used in various fields.

A method is also known in which paper is made from a mixture or organic fibers (e.g. pulp) and activated carbon and a honeycomb structure is fabricated from the resulting activated carbon containing paper. However, this method is unable to achieve a high loading of activated carbon (the maximum will be about 70 g per liter of paper volume) and the honeycomb structure fabricated has not been satisfactory in terms of adsorption capacity or service life.

SUMMARY OF THE INVENTION

An object, therefore, of the present invention is to provide a high-performance honeycomb structure that supports activated carbon as the principal adsorbent and which is available in any desired size. Another object of the present invention is to provide a process for fabricating such a honeycomb structure.

The present invention successfully attains the first object by providing honeycomb structures comprising an inorganic fiber made paper of high void factor and activated carbon that is loaded and fixed in the voids between fibers in said paper. The present invention attains the second object by providing a process for fabricating an activated carbon supporting honeycomb structure comprising the following steps: dipping an inorganic fiber made paper in a suspension of fine particulate activated carbon and a binder or coating said suspension over the inorganic fiber made paper; drying the paper so that the activated carbon will fill the voids between fibers in the paper, superposing sheets of the activated carbon filled paper alternately with corrugated sheets of the same paper; and bonding the individual sheets together with an adhesive to form a honeycomb structure.

In a preferred embodiment, the honeycomb structure of the present invention has at least 70 g/L (of paper volume) of activated carbon loaded in the voids between fibers in the inorganic fiber made paper having a void factor of at least 60%.

DETAILED DESCRIPTION OF THE PREFERRED EMBODIMENTS

The process for fabricating the honeycomb structure of the present invention is described hereinafter in detail.

The inorganic fibers from which paper is to be made are preferably, but not limited to, glass fibers having a thickness of about 6-9 $\mu$m and a length of about 8-12 mm that are formed of E glass or C glass. Paper may be made from these inorganic fibers by a customary method, desirably under such conditions that the resulting paper will have an inter-fiber void factor of at least about 60% and a thickness of about 0.1-1.0 mm. The paper is then loaded with activated carbon which should be in the form of fine particles with a size of about 20-60 $\mu$m. The fine particulate activated carbon is suspended in water together with a binder desirably in an amount not exceeding one half the amount of the activated carbon. Acrylic and vinylidene chloride binders that maintain flexibility in a dried state are preferred since they facilitate corrugation that is to be subsequently effected on the paper. The suspension is absorbed by the paper by either dipping or coating (a flame-retardant paper can be produced if a flame-retardant is incorporated in the suspension of activated carbon). By subsequent drying, the activated carbon will be loaded in the voids between fibers in the paper and fixed to the fibers by means of binder. If the void factor of the paper is 60% or more, the above-described method enables activated carbon to be easily loaded in paper in an amount of at least 70 g/L (of paper volume) or at least 30 g/m$^2$ (provided that the paper thickness is on the order of 0.1 mm).

Figure 1:
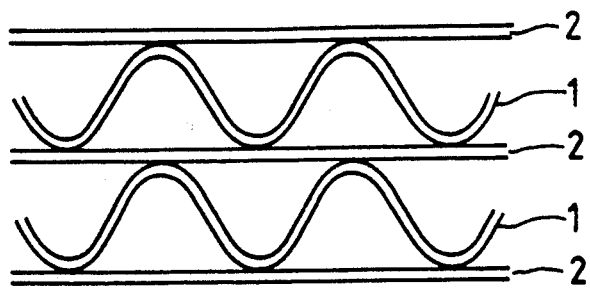
FIG. 1 is a side view showing how corrugated sheets of paper are superposed alternately with flat sheets of the same paper in the honeycomb structure of the present invention.
Figure 2:
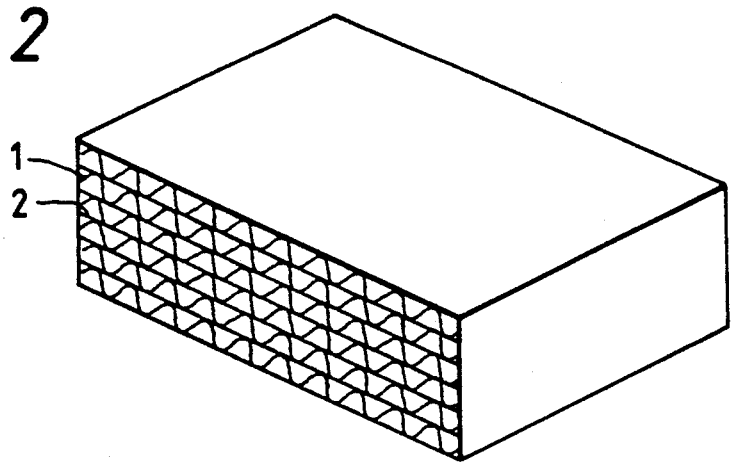
FIG. 2 is a perspective view showing an example of the honeycomb structure of the present invention.

Part of carbon loaded paper thus obtained is corrugated by a conventional method, and as shown in FIG. 1, sheets of the corrugated paper 1 are superposed alternately with flat sheets of the same paper 2, and adjacent sheets of paper are bonded at respective points of contact by means of an adhesive so as to fabricate a honeycomb structure of the type shown in FIG. 2. A suitable adhesive that may be used is selected from among acrylic binders and colloidal silica.

The so fabricated product may be put to use as a medium for treatment of gases without being subjected to any special activation treatment.

As described above, the activated carbon supporting honeycomb structure of the present invention has a large amount of activated carbon loaded in the voids between fibers in an inorganic fiber made paper of high void factor. Thus, not only does it have an adsorption (or decomposition) capacity substantially comparable to that of the prior art extrusion-molded honeycomb structure of activated carbon but it can be readily produced in large sizes that have been previously impossible to produce with the extrusion technique. The process of the present invention eliminates the need to activate carbon after it has been molded into a bulky honeycomb structure and this enables products of high dimensional precision to be obtained at low cost and in an easy way. As a further advantage, the skeleton provided by the inorganic fibers will minimize dimensional changes due to moisture and impart high chemical resistance and good mechanical durability. Compared to the honeycomb structure fabricated from paper that is made from a mixture of pulp and activated carbon, the honeycomb structure of the present invention features high adsorption capacity since it permits a much greater amount of activated carbon to be supported. Making paper from a mixture of pulp and activated carbon will suffer an inevitable loss of the costly activated carbon but this problem is practically absent from the process of the present invention which performs loading of activated carbon following the making of paper.

Another advantage of the present invention lies in the high degree of freedom in choosing the type and characteristics of activated carbon to be supported because it is not limited by such factors as the ease of paper making and extrusion moldability.

If vinylidene chloride is used as a binder, it also serves as a flame retardant and a honeycomb structure having improved flame retardancey can be obtained without using any of the special flame retardants mentioned below.

Products that support not only activated carbon but also a flame retardant such as an organophosphorus-containing nitrogenous compound or antimony trioxide will exhibit a high degree of flame retardance because the added flame retardant combined with the inorganic fibers serving to provide a skeleton for the structure.

Having the features described above, the honeycomb structure of the present invention may be used as filters for ozone decomposition, deodorization, as catalyst supports, or for various other purposes.

The present invention is hereunder illustrated by way of examples.

EXAMPLE 1

Paper 0.2 mm thick that had an inter-fiber void factor of 94% was made from E glass fibers (diameter, 9 μm; length, 10 mm) and coated with a slurry containing activated carbon (specific surface area, 1,300 m²/g) and an acrylic binder in an amount one tenth of the activated carbon content. The coated slurry was dried. Part of the resulting paper (activated carbon loading, 450 g/L of paper volume or 90 g/m²) was corrugated. As shown in FIG. 1, sheets of the corrugated paper 1 were superposed alternately with flat sheets of the same paper 2 and adjacent sheets were bonded together at respective points of contact of means of an acrylic binder containing a thickener. As a result, a honeycomb structure of the type shown in FIG. 2 was fabricated (cell width, ca. 3 mm; cell height, ca. 2 mm; open area, ca. 70%).

The ability of this activated carbon supporting honeycomb structure to decompose ozone was examined under the following conditions:

Air supply rate: 1.0 m/sec.
Ozone concentration in air feed: 1.2 ppm.
Thickness of honeycomb structure parallel to the direction of air supply: 20 mm.

Figure 3:
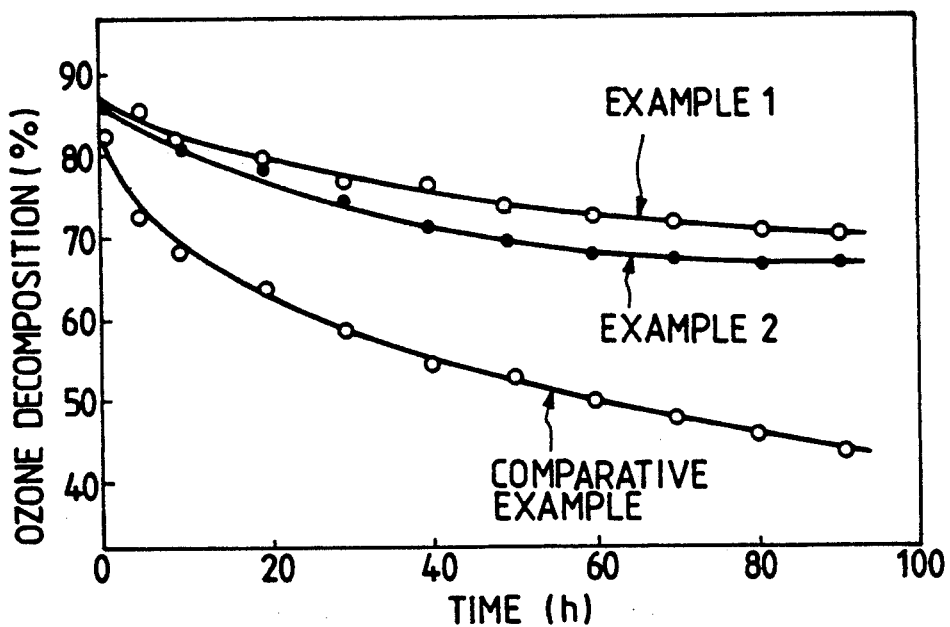
FIG. 3 is a graph showing the results of tests conducted to investigate the ability of ozone decomposition of the products fabricated in Examples 1 and 2 and the comparative sample.

For comparison, the same test was conducted on an activated carbon supporting honeycomb structure (activated carbon supported in an amount of 70 g/L of paper volume) produced from paper that had been made from a mixture of pulp and activated carbon loaded up to a theoretically possible level. The results are shown in FIG. 3.

EXAMPLE 2

An activated carbon supporting honeycomb structure was fabricated as in Example 1 except that vinylidene chloride was used as the binder in the coating slurry which contained activated carbon. The fabricated product exhibited a high degree of flame retardancy. This honeycomb structure was subjected to the same test as conducted in Example 1. The results are also shown in FIG. 3.

We claim:

1. A honeycomb structure used for ozone decomposition comprising:
   an inorganic fiber made paper having a void factor of at least 60%; and
   activated carbon and binder therefor that is loaded in an amount of 70 g per liter of paper volume and fixed in the voids between fibers in said paper.

2. A honeycomb structure according to claim 1 wherein said inorganic fiber made paper has a void factor of at least 90–96%.

3. A honeycomb structure according to claim 1 wherein said inorganic fiber made paper has a thickness of 0.1–1.0 mm.

4. A process for fabricating an activated carbon supporting honeycomb structure comprising the following steps: dipping an inorganic fiber made paper having a high void factor in a suspension of fine particulate activated carbon and a binder; drying the paper so that the activated carbon will fill the voids between fibers in the paper; superposing sheets of the activated carbon filled paper alternately with corrugated sheets of the same paper; and bonding the individual sheets together with an adhesive to form a honeycomb structure.

5. A process according to claim 4 where said inorganic fiber made paper has a void factor of at least 60%.

6. A process according to claim 4 wherein said inorganic fiber made paper has a void factor of 90–96%.

7. A process according to claim 4 wherein said activated carbon is loaded in an amount of at least 70 g per liter of paper volume.

8. A process according to claim 4 wherein said inorganic fiber made paper has a thickness of 0.1–1.0 mm.

9. A process according to claim 4 wherein said binder is vinylidene chloride.

10. A process for fabricating an activated carbon supporting honeycomb structure comprising the following steps:
    coating a suspension of fine particulate activated carbon and a binder over an inorganic fiber made paper having a high void factor;

drying the paper so that the activated carbon will fill the voids between fibers in the paper;

superposing sheets of the activated carbon filled paper alternately with corrugated sheets of the same paper; and bonding the individual sheets together with an adhesive to form a honeycomb structure.

11. A honeycomb structure comprising: a plurality of sheets of inorganic fiber made paper of high void factor and activated carbon and binder therefor that is loaded and fixed in the voids between fibers in said paper; and a plurality of corrugated sheets of said inorganic fiber made paper alternately between said inorganic fiber made paper loaded with activated carbon.

* * * * *